United States Patent [19]

Matsubara et al.

[11] 4,217,477
[45] Aug. 12, 1980

[54] FOOD TEMPERATURE CONTROL IN A MICROWAVE OVEN

[75] Inventors: Sigeo Matsubara, Hiranohonmachi; Tatsuya Tsuda, Osaka, both of Japan

[73] Assignee: Sharp Kabushiki Kaisha, Osaka, Japan

[21] Appl. No.: 856,098

[22] Filed: Nov. 30, 1977

[30] Foreign Application Priority Data

Nov. 30, 1976 [JP] Japan .................................. 51-146024
Dec. 15, 1976 [JP] Japan .................................. 51-153154

[51] Int. Cl.² ............................................. H05B 9/06
[52] U.S. Cl. ........................ 219/10.55 B; 219/10.55 E; 219/10.55 R; 219/516; 73/343 R; 99/421 TP
[58] Field of Search .............. 219/10.55 B, 10.55 C, 219/10.55 R, 497, 516, 10.55 E, 510, 413; 73/343 R; 361/103, 106; 99/331, 421 TP; 303/19, 68

[56] References Cited

U.S. PATENT DOCUMENTS

| 2,273,734 | 2/1942 | Pearce | 219/413 |
| 2,657,580 | 11/1953 | Schroeder | 99/331 |
| 2,820,130 | 1/1958 | Dadson | 219/516 |
| 3,266,409 | 8/1966 | Oyler | 99/331 |
| 3,269,651 | 8/1966 | Willson | 219/516 |
| 3,431,399 | 3/1969 | Venning | 219/497 |
| 3,573,431 | 4/1971 | Tyler et al. | 219/516 |
| 3,800,123 | 3/1974 | Maahs | 219/407 |
| 3,908,111 | 9/1975 | Du Bois et al. | 99/331 |
| 4,035,787 | 7/1977 | Hornung | 219/10.55 B |
| 4,093,841 | 6/1978 | Dills | 219/10.55 E |

Primary Examiner—B. A. Reynolds
Assistant Examiner—Philip H. Leung
Attorney, Agent, or Firm—Birch, Stewart, Kolasch & Birch

[57] ABSTRACT

The present invention is directed to a microwave oven which may operate in a temperature control mode, wherein the temperature of a food to be cooked is maintained between two selectable values. The food temperature is sensed by a probe adapted for insertion into food being cooked in the microwave oven. The probe is electrically communicated to a microwave generation control circuit through a plug which is removably engaged in a socket secured by a microwave oven wall. When the plug is engaged by the socket, the microwave oven is automatically placed in the temperature control mode.

7 Claims, 6 Drawing Figures

FOOD TEMPERATURE CONTROL IN A MICROWAVE OVEN

BACKGROUND OF THE INVENTION

The present invention relates to a microwave oven and, more particularly, to a microwave oven which operates in both a cooking period control mode wherein a microwave cooking period is controlled and a temperature control mode wherein the temperature of a food to be cooked is controlled.

In a conventional microwave oven, the cooking control is achieved by controlling a time period during which microwave energy is generated. However, more preferred cooking is achieved in certain foodstuff such as meat when the food temperature is controlled. When cooking meat a preferred food temperature is, for example, 75° C.

A microwave oven responsive to the food temperature is disclosed in U.S. Pat. No. 4,035,787 entitled "FOOD TEMPERATURE RESPONSIVE CONTROL APPARATUS" issued July 12, 1977, wherein the food temperature is sensed by a probe inserted into the food being cooked in the microwave oven and the microwave generation is terminated when the food temperature reaches a preselected value.

In the above-mentioned conventional temperature control system, the microwave cooking is terminated when the food temperature reaches the preselected value. The system is not adapted to maintain the food at the preselected temperature for a predetermined time period and, therefore, the microwave oven of U.S. Pat. No. 4,035,787 is not suited for simmering the foodstuff.

Moreover, as is conventional a mannual selection switch is provided on most conventional microwave ovens for selecting the cooking period control mode and the food temperature control mode. Therefore, there is a possibility that the microwave oven may operate in an operation mode not desired.

OBJECTS AND SUMMARY OF THE INVENTION

Accordingly, an object of the present invention is to provide a microwave oven which operates in a cooking period control mode and a food temperature control mode.

Another object of the present invention is to ensure selection of operation modes of a microwave oven between a cooking period control mode and a food temperature control mode.

Still another object of the present invention is to provide a control system for a microwave oven which can maintain food being cooked at a preselected temperature for a predetermined time period.

Yet another object of the present invention is to prevent erroneous operation of a microwave oven.

A further object of the present invention is to provide a microwave oven suited for simmering a foodstuff.

A still further object of the present invention is to provide a microwave oven which is automatically placed in a food temperature control mode when a food temperature sensing probe is electrically communicated to a microwave generation control circuit.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a microwave generation control circuit functions to control a time period during which the microwave cooking is performed and a temperature of food being cooked. The food temperature is maintained between two selectable values. More specifically, when the food temperature reaches a higher preselected value, the microwave generation is interrupted, and the microwave generation is again initiated when the food temperature falls to a lower preselected value.

The food temperature is sensed by a probe adapted for insertion into food being cooked in the microwave oven. The probe is electrically communicated to the microwave generation control circuit through a plug which is removably engaged in a socket secured by a microwave oven wall. When the plug is not engaged by the socket, the microwave oven can not be placed in the food temperature control mode.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
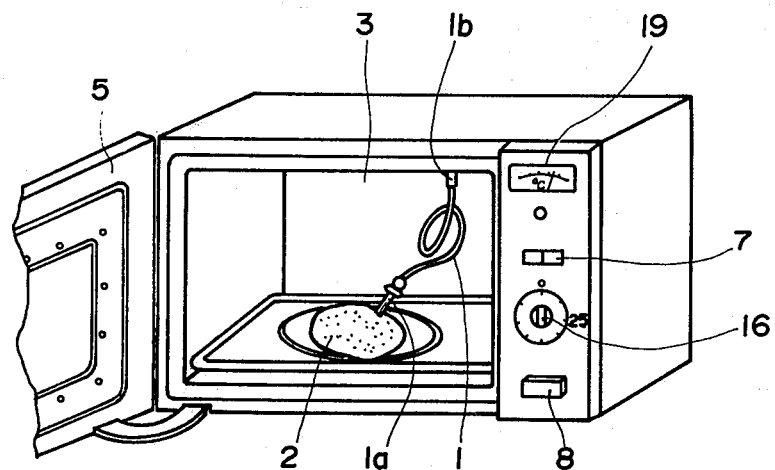
FIG. 1 is a perspective view of a microwave oven of the prior art.

Referring now in detail to the drawings, and to facilitate a more complete understanding of the present invention, a conventional microwave oven which operates in a cooking period controlling mode and a food temperature controlling mode will be first described with reference to FIGS. 1 and 2.

When the microwave cooking is desired to be conducted in the food temperature controlling mode, a sensor 1a of a food temperature sensing probe 1 is inserted into a foodstuff 2. The foodstuff 2 is mounted on a tray disposed within an oven cavity 3, and a plug 1b of the food temperature sensing probe 1 is inserted into a socket 4 secured by a wall of the oven cavity 3. Thereafter, when an oven door 5 is closed, a door switch 6 is closed.

The microwave oven is placed in the food temperature controlling mode through a cook period/food temperature mode selection switch 7. Upon closing a cook switch 8, a relay coil 9a is power supplied from a power source 10 to turn on a relay contact 9b.

Under these conditions, a magnetron drive 11 is connected to receive the power supply from the power source 10 and, hence, a magnetron 12 is energized to generate microwaves for heating the foodstuff 2 disposed in the oven cavity 3.

When a food temperature reaches a preselected value, a temperature detection control circuit 13 functions to supply a current to a relay coil 14a, whereby a relay contact 14b is turned off. The turning off of the relay contact 14b forces the relay contact 9b to turn off. Accordingly, the microwave generation from the magnetron 12 is terminated. A preferred food temperature is preselected through a temperature selector 15 associated with the temperature detection control circuit 13. The preselected value is indicated at a preselected temperature indicator 19.

In the cooking time period controlling mode, the cook period/food temperature mode selection switch 7 is manually placed in the cook period mode. A preferred time period is set through a timer 16 and, then, a timer switch 17 is automatically turned on. Upon closing the cook switch 8, the relay contact 9b is closed and the magnetron 12 is energized for a period of time preselected through the timer 16. When the preselected time period is counted by the timer 16, the timer switch 17 is turned off to open the relay contact 9b. Consequently, the generation of the microwave energy is terminated. In FIG. 2, the reference numeral 18 designates a fuse.

In the above-mentioned conventional microwave oven, the selection of the operation mode between the cooking time period controlling mode and the food temperature controlling mode is manually achieved through the cook period/food temperature mode selection switch 7. Therefore, there is a possibility that the microwave oven erroneously operates in an operation mode not desired.

Moreover, in the above-mentioned conventional microwave oven, the microwave cooking is terminated when the food temperature reaches the preselected value. The system is not adapted to maintain the food at the preselected temperature for a predetermined time period. Therefore, the conventional microwave oven is not suited for simmering the foodstuff.

Figure 2:
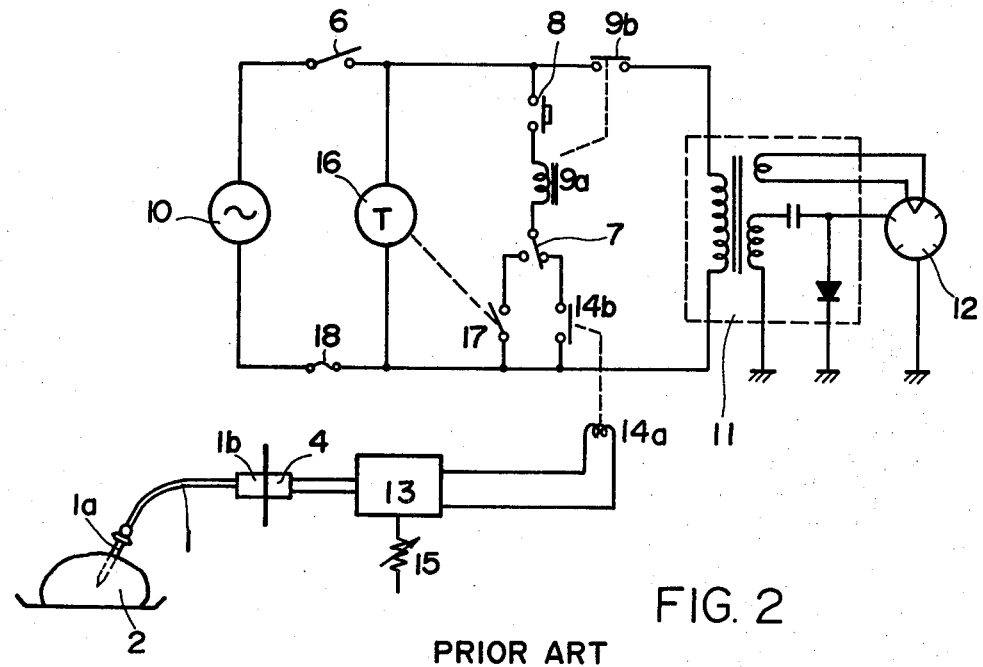
FIG. 2 is a circuit diagram of a microwave generation control circuit of the microwave oven of FIG. 1.
Figure 3:
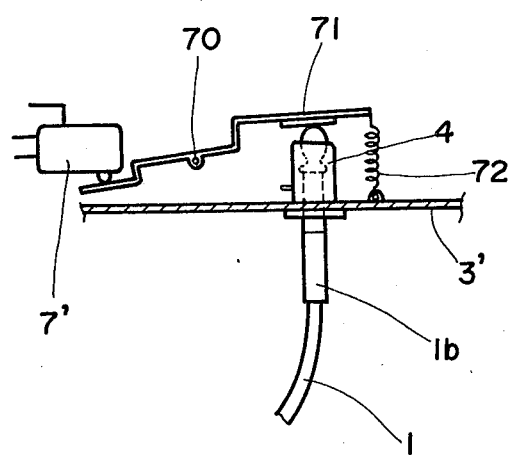
FIG. 3 is a sectional view of an embodiment of a switching means of the present invention.

FIG. 3 shows an embodiment of a switching means of the present invention, which automatically places the microwave oven in the food temperature controlling mode when the probe 1 is placed in the operative condition. Like elements corresponding to those of FIGS. 1 and 2 are indicated by like numerals.

A mode selection micro-switch 7' is disposed above an upper wall 3' of the oven cavity. The micro-switch 7' is switched by a lever 71 which is rotatably supported around a fulcrum 70. The micro-switch 7' is normally placed in the ON condition by a spring 72 fixed to an end of the lever 71. When the plug 1b of the probe 1 is inserted into the socket 4 secured by the upper wall 3', the micro-switch 7' is placed in the OFF condition.

When the micro-switch 7' is in the OFF condition, that is, when the plug 1b of the probe 1 is inserted into the socket 4, the mode selection switch 7 of FIG. 2 is automatically placed in the food temperature controlling mode. When the plug 1b is released from the socket 4, the micro-switch 7' is turned on. At this moment, the mode selection switch 7 of FIG. 2 is automatically placed in the cooking time period controlling mode.

Figure 4:
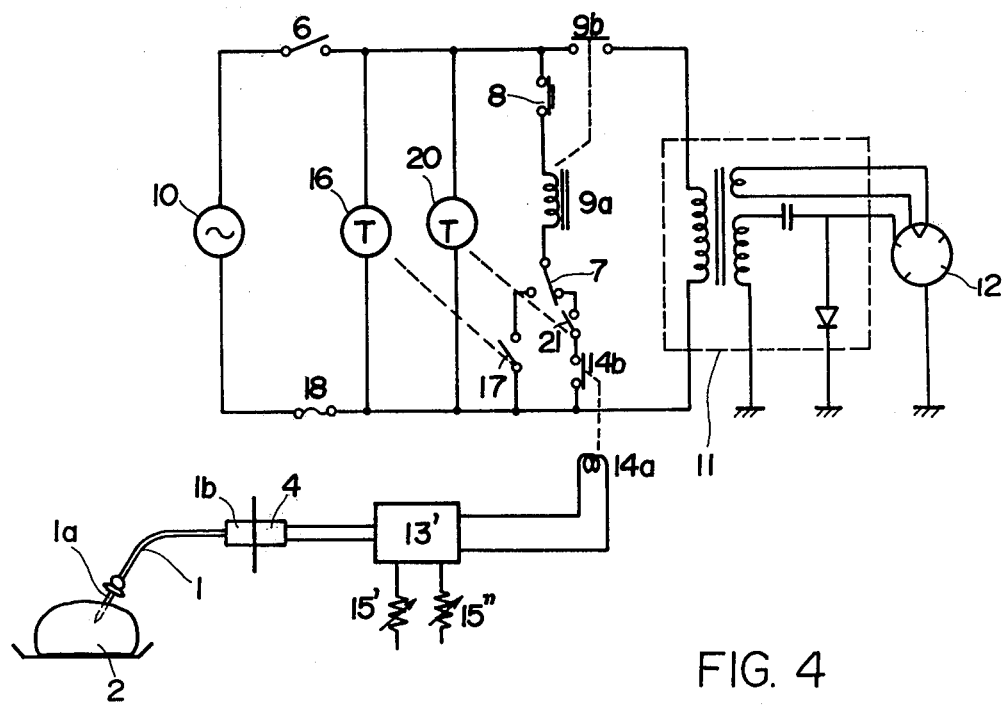
FIG. 4 is a circuit diagram of an embodiment of a microwave generation control circuit of the present invention.

FIG. 4 shows an embodiment of a microwave generation control circuit of the present invention. Like elements corresponding to those of FIG. 2 are indicated by like numerals.

A long period timer 20, for example, a two-hour timer, is provided in a fashion parallel to the timer 16. A timer switch 21 associated with the long period timer 20 is connected to the relay contact 14b in a series fashion. A temperature detection control circuit 13' of the present invention includes a higher preselectable temperature adjusting means 15' and a lower preselectable temperature adjusting means 15". The foodstuff is intermittently heated so that the food temperature is maintained between the higher preselected value and the lower preselected value.

In the food temperature controlling mode, the mode selection switch 7 is placed in the food temperature controlling mode, and the long period timer 20 is set at a desired time period to close the timer switch 21. Upon closing the cook switch 8, the magnetron 12 is power supplied to generate the microwave energy for cooking purposes.

Figure 5:
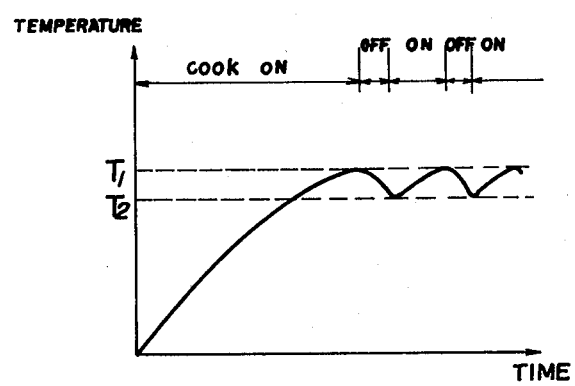
FIG. 5 is a graph for explaining operation of the microwave generation control circuit of FIG. 4.

The food temperature is detected by the sensor 1a of the sensing probe 1, and the detection value is applied to the temperature detection control circuit 13'. When the temperature of the foodstuff 2 reaches the higher preselected value $T_1$ determined by the higher preselectable temperature adjusting means 15' as shown in FIG. 5, the temperature detection control circuit 13' functions to supply an electric current to the relay coil 14a to turn off the relay contact 14b. Accordingly, the microwave generation from the magnetron 12 is interrupted.

The food temperature is gradually reduced as shown in FIG. 5. When the food temperature falls down to the lower preselected value $T_2$ determined by the lower preselectable temperature adjusting means 15", the current supply to the relay coil 14a is terminated to again turn on the relay contact 14b. Thus, the relay contact 9b is closed to energize the magnetron 12. Thereafter, when the food temperature again reaches the higher preselected value $T_1$, the energization of the magnetron 12 is interrupted. The above-mentioned operation is repeated during a time period determind by the long period timer 20. That is, the food temperature is maintained between the preselected values $T_1$ and $T_2$.

Figure 6:
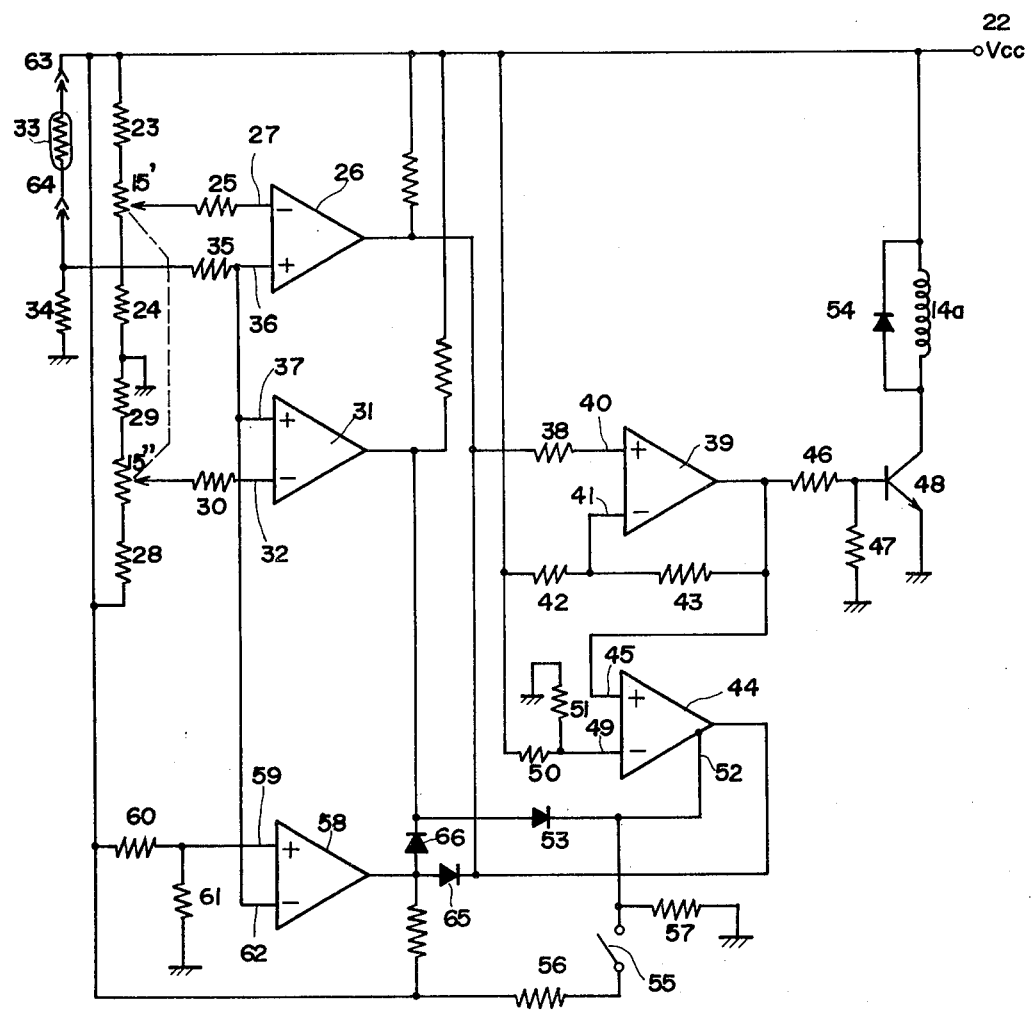
FIG. 6 is a circuit diagram of an embodiment of a food temperature detection control circuit employed in the microwave generation control circuit of FIG. 4.

FIG. 6 shows an embodiment of the temperature detection control circuit 13' of the present invention. The higher preselectable temperature adjusting means 15' and the lower preselectable temperature adjusting means 15" are variable resistors.

One end of the variable resistor 15' is connected to a $V_{cc}$ power supply terminal 22 via a resistor 23. The other end of the variable resistor 15' is grounded through a resistor 24. The movable contact of the variable resistor 15' develops a preselected voltage to a negative input terminal 27 of an operation amplifier 26 through a resistor 25. One end of the variable resistor 15" is connected to the $V_{cc}$ power supply terminal 22 via a resistor 28, and the other end of the variable resistor 15" is grounded through a resistor 29. The movable contact of the variable resistor 15" develops a preselected voltage to a negative input terminal 32 of an operation amplifier 31 through a resistor 30.

The sensor 1a of the sensing probe 1 includes a thermistor 33 which is connected to a resistor 34 in a series fashion when the plug 1b is inserted into the socket 4. The voltage level divided by the thermistor 33 and the resistor 34 is applied to the positive input terminals 36 and 37 of the operation amplifiers 26 and 31 through a resistor 35. The variable resistors 15' and 15" are mechanically associated with each other so that the set voltage determined by the variable resistor 15' is higher than the set voltage determined by the variable resistor 15". A preferred temperature difference between the higher preselected value $T_1$ and the lower preselected value $T_2$ is 3° C. through 5° C.

The resistance value of the thermistor 33 is extremely high before the microwave cooking is conducted. Accordingly, in the initial condition, the input voltage levels applied to the positive input terminals 36 and 37 of the operation amplifiers 26 and 31 are lower than the input voltage levels applied to the negative input terminals 27 and 32 of the operation amplifiers 26 and 31, respectively. Therefore, the output level of the operation amplifiers 26 and 31 is approximately zero.

The output signal of the operation amplifier 26 is applied to a positive input terminal 40 of an operation amplifier 39 through a resistor 38. Therefore, the output of the operation amplifier 39 takes the zero level. A negative input terminal 41 of the operation amplifier 39 is connected to receive a voltage divided by resistors 42 and 43. The output of the operation amplifier 39 is applied to a positive input terminal 45 of another operation amplifier 44. The output of the operation amplifier 39 is also applied to a base electrode of a transistor 48 through a voltage divider consisting of resistors 46 and 47. The output voltage of the operation amplifier 44 is the zero level, and the transistor 48 is maintained in the OFF condition in the initial state.

The relay coil 14a is interposed between the collector electrode of the transistor 48 and the $V_{cc}$ power supply terminal 22. The current does not flow through the relay coil 14a at the initial state. A negative input terminal 49 of the operation amplifier 44 is connected to receive a voltage divided by resistors 50 and 51. A strobe terminal 52 of the operation amplifier 44 is connected to receive the output signal of the operation amplifier 31 through a diode 53. A diode 54 functions to protect the transistor 48.

When the microwave cooking is conducted, the food temperature gradually rises and, hence, the resistance value of the thermistor 33 is gradually reduced. When the food temperature reaches the lower preselected value $T_2$ determined by the variable resistor 15", the input voltage applied to the positive input terminal 37 of the operation amplifier 31 becomes higher than the input voltage applied to the negative input terminal 32. Accordingly, the output level of the operation amplifier 31 becomes identical with the power supply voltage $V_{cc}$. The thus developed output voltage of the operation amplifier 31 is applied to the strobe terminal 52 of the operation amplifier 44 through the diode 52. At this moment, the output of the operation amplifier 26 still takes the zero level and, therefore, the output of the operation amplifier 39 is held at the zero level. Consequently, the transistor 48 is maintained OFF to continue the microwave generation.

Thereafter, when the food temperature reaches the higher preselected value $T_1$ determined by the variable resistor 15', the input voltage applied to the positive input terminal 36 of the operation amplifier 26 becomes higher than the set voltage applied to the negative input terminal 27 of the operation amplifier 26. The output of the operation amplifier 26 rises to the power supply level $V_{cc}$. Therefore, the output of the operation amplifier 39 is pulled up to the $V_{cc}$ to turn on the transistor 48. The electric current flows through the relay coil 14a to interrupt the microwave generation.

At this moment the output of the operation amplifier 44 is pulled up to the $V_{cc}$ level, which is applied to the negative input terminal 40 of the operation amplifier 39. Therefore, the output of the operation amplifier 39 is maintained at the $V_{cc}$ level even when the output of the operation amplifier 26 changes to the zero level. That is, the electric current is continuously applied to the relay coil 14a.

Under these conditions when the food temperature decreases to the lower preselected value $T_2$ determined by the variable resistor 15", the output of the operation amplifier 31 changes to the zero level. Since the input level of the strobe terminal 52 of the operation amplifier 44 becomes zero, the output of the operation amplifier 44 changes to the zero level. Accordingly, the output of the operation amplifier 39 changes to the zero level to turn off the transistor 48. The electric current flowing through the relay coil 14a is interrupted to again energize the magnetron 12.

The above-mentioned operation is repeated so that the food temperature is maintained between the lower preselected value $T_2$ and the higher preselected value $T_1$.

A manual switch 55 is disposed to select the above-mentioned temperature control and a single value control mode wherein the microwave generation is terminated once the food temperature reaches a preselected value. When the manual switch 55 is closed, the strobe terminal 52 of the operation amplifier 44 is connected to receive a low voltage divided by resistors 56 and 57. The output of the operation amplifier 44 is maintained at the zero level without regard to the food temperature. Therefore, the microwave generation is terminated when the food temperature reaches the higher preselected value $T_1$ determined by the variable resistor 15'.

An additional operation amplifier 58 is provided for preventing the an erroneously operation. A positive input terminal 59 of the operation amplifier 58 is connected to receive a voltage divided by resistors 60 and 61, whereas a negative input terminal 62 of the operation amplifier 58 is connected to receive the voltage signal applied to the positive terminals 36 and 37 of the operation amplifiers 26 and 31.

In the normal operation mode, the thermistor 33 is disposed between connectors 63 and 64, and the output of the operation amplifier 58 is maintained at the zero level. When the thermistor 33 is erroneously released from the connectors 63 and 64, the output of the operation amplifier 58 changes to the $V_{cc}$ level since the negative input terminal 62 of the operation amplifier 58 receives an input signal of zero level. The thus developed output signal of the level $V_{cc}$ of the operation amplifier 58 is applied to the negative input terminal 40 of the operation amplifier 39 through a diode 65 and the resistor 38, and to the strobe terminal 52 of the operation amplifier 44 through a diode 66 and the diode 53. In this way, the feed back loop is formed between the operation amplifiers 39 and 44 to continuously supply the electric current to the relay coil 14a. Therefore, the microwave generation is not conducted even when the cook switch 8 is actuated.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A microwave oven including a food temperature sensing probe and a microwave generation control circuit for controlling the microwave generation from a magnetron in a cook time period control mode wherein a time period is controlled during which the microwave generation is conducted and in a food temperature control mode wherein a food temperature being cooked is controlled, said microwave generation control circuit comprising:
- a mode selection circuit for selecting one of said two operation modes;
- a food temperature sensing probe including a plug, and a switching means operatively positioned adjacent to a socket secured by a wall of said microwave oven, said socket being adapted to removably retain said plug;
- said switching means automatically placing said mode selection circuit in said food temperature control mode when said plug is inserted into said socket; and
- said switching means being responsive only to the one step positioning of said plug of said food temperature sensing probe in the operative position within said socket in the microwave oven.

2. A microwave oven according to claim 1, wherein said switching means includes a lever normally spring biased downwardly over said socket, said lever being engaged by said plug to be pivoted upwardly thereby automatically placing said mode selection circuit in said food temperature control mode.

3. The microwave oven of claim 1, wherein said microwave generation control circuit comprises a first means for interrupting the microwave generation when the food temperature reaches a higher preselected value and a second means for initiating the microwave generation when the food temperature reaches a lower preselected value.

4. The microwave oven according to claim 3, wherein said higher preselected value and said lower preselected value are associated with each other so that said higher preselected value is higher than said lower preselected value by 3° C. through 5° C.

5. A microwave oven for heating a foodstuff disposed within an oven cavity including a food temperature sensing probe and a microwave generation control circuit for controlling the microwave generation from a magnetron in a cook time period control mode wherein a time period is controlled during which the microwave generation is conducted and in a food temperature control mode wherein a food temperature being cooked is controlled, said microwave generation control circuit comprising:
- a mode selection circuit for selecting said two operation modes;
- a food temperature sensing probe being operative to detect a temperature of said foodstuff being cooked in said oven cavity;
- switching means for placing said mode selection circuit into the food temperature control mode when said food temperature sensing probe is in the operative position;
- said food temperature sensing probe including a plug, and said switching means including a socket secured by an oven wall for removably engaging said plug and said switching means automatically placing said mode selection circuit in said food temperature control mode when said plug is inserted into said socket;
- a higher temperature setting means for presetting a higher temperature;
- a lower temperature setting means for presetting a lower temperature;
- a first control means for interrupting the microwave generation from said microwave generation source when the food temperature detected by said food temperature sensor reaches said higher temperature; and
- a second control means for initiating the microwave generation from said microwave generation seource when the food temperature detected by said food temperature sensor reaches said lower temperature.

6. A microwave oven according to claim 5, wherein said higher temperature setting means and said lower temperature setting means are mechanically associated with each other so that said preselected higher temperature is higher than said preselected lower temperature by 3° C. through 5° C.

7. A microwave oven according to claim 5, wherein said switching means includes a lever normally spring biased downwardly over said socket, said lever being engaged by said plug to be pivoted upwardly thereby automatically placing said mode selection circuit in said food temperature control mode.

* * * * *